US008848675B2

(12) United States Patent
Bottomley et al.

(10) Patent No.: US 8,848,675 B2
(45) Date of Patent: Sep. 30, 2014

(54) TIME-DIVISION MULTIPLEXED PILOT SIGNAL FOR INTEGRATED MOBILE BROADCASTS

(71) Applicant: Telefonaktiebolaget L M Ericsson (Publ), Stockholm (SE)

(72) Inventors: Gregory E. Bottomley, Cary, NC (US); Dirk Gerstenberger, Vallentuna (SE); Lars Lindbom, Karlstad (SE); Yin-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 42 days.

(21) Appl. No.: 13/739,851

(22) Filed: Jan. 11, 2013

(65) Prior Publication Data

US 2013/0128800 A1    May 23, 2013

Related U.S. Application Data

(63) Continuation of application No. 12/572,423, filed on Oct. 2, 2009, now Pat. No. 8,391,253.

(60) Provisional application No. 61/116,455, filed on Nov. 20, 2008.

(51) Int. Cl.
*H04J 3/00* (2006.01)

(52) U.S. Cl.
USPC ........................................... 370/336

(58) Field of Classification Search
None
See application file for complete search history.

(56) References Cited

U.S. PATENT DOCUMENTS

| 6,028,852 | A | 2/2000 | Miya et al. |
| 6,480,479 | B1 | 11/2002 | Miya et al. |
| 6,647,003 | B1 | 11/2003 | Abeta et al. |
| 6,904,078 | B1 | 6/2005 | Abeta et al. |
| 2001/0012301 | A1 | 8/2001 | Yi et al. |
| 2004/0085989 | A1* | 5/2004 | Boumendil et al. .......... 370/442 |
| 2009/0103497 | A1* | 4/2009 | Fernandez-Corbaton et al. ............................ 370/335 |
| 2011/0261736 | A1* | 10/2011 | Stewart et al. ................. 370/310 |

FOREIGN PATENT DOCUMENTS

| WO | WO 2006/065053 A1 | 6/2006 |
| WO | WO 2007/096799 A1 | 8/2007 |

OTHER PUBLICATIONS

Translation of the Chinese Search Report dated Apr. 2, 2013 from the Chinese Patent Application No. 200980147086.8, pp. 1-2.

(Continued)

*Primary Examiner* — Sulaiman Nooristany

(57) ABSTRACT

A pilot channel signal for time-division multiplexing with one or more traffic channel signals in a broadcast/multi-cast signal and for code-division multiplexing with a continuously transmitted pilot channel signal is described. In an exemplary method for transmitting a broadcast/multicast signal, a pilot symbol sequence is obtained for each slot of one or more frames of the broadcast/multicast signal, so that the pilot symbol sequence varies for each slot of a given frame. The pilot symbol sequence for each slot is spread with a channelization code, and the spread pilot symbol sequence for each slot is scrambled, using a scrambling code, to form a first pilot channel signal. The first pilot channel signal is transmitted so that it is time-division multiplexed with one or more traffic channel signals transmitted during each slot and code-division multiplexed with a second pilot channel signal transmitted during all slots of the one or more frames.

17 Claims, 5 Drawing Sheets

(56) References Cited

OTHER PUBLICATIONS

3GPP TS 25.211 v5.0.0 (Mar. 2002) $3^{rd}$ Generation Partnership Project; Technical Specification Group Radio Access Network; Physical channels and Mapping of Transport Channels Onto Physical Channels (FDD) (Release 5), the whole document.

3GPP TS 25.221 (V8.5.0) $3^{rd}$ Generation Partnership Project; Technical Specification Group Radio Access Network; Physical channels and Mapping of Transport Channels Onto Physical Channels (TDD) Release 8, the whole document.

3GPP TS 25.221 (V8.2.0) $3^{rd}$ Generation Partnership Project; Technical Specification Group Radio Access Network (TDD) Release 8, the whole document.

* cited by examiner

TIME-DIVISION MULTIPLEXED PILOT SIGNAL FOR INTEGRATED MOBILE BROADCASTS

CROSS-REFERENCE TO RELATED APPLICATIONS

This application claims the benefit of U.S. Provisional Application No. 61/116,455, filed Nov. 20, 2008, the disclosure of which is incorporated herein by reference, and is a Continuation of U.S. Regular application Ser. No. 12/572,423 filed Oct. 2, 2009, the entire contents of which are incorporated herein by reference.

TECHNICAL FIELD

The present invention relates generally to wireless communications systems, and more particularly relates to methods and apparatus for transmitting pilot information in a broadcast/multicast single-frequency-network signal.

BACKGROUND

The $3^{rd}$-Generation Partnership Project (3GPP) has recently developed specifications, applicable to Release-7 Universal Terrestrial Radio Access (UTRA) systems, for delivering so-called Multimedia Broadcast Multicast Services (MBMS) using a single-frequency network (SFN). MBMS over SFN (MBSFN) provides significantly higher spectral efficiency compared to the MBMS approach in earlier systems (e.g., Release 6 systems), and is primarily intended for broadcasting mobile television services that demand high bit-rates on carriers dedicated to MBMS. Since MBMS services are broadcast only, MBSFN is inherently suited for transmissions in unpaired frequency bands.

With SFN transmissions, multiple base stations transmit the same waveform at the same time. A mobile terminal can receive signals from two or more of these base stations and treat the received signal as if it was transmitted by a single base station serving a large cell. For UTRA systems, SFN transmission implies that a cluster of time synchronized base stations (Node B's, in 3GPP terminology), transmit the same data, using the same channelization and scrambling codes.

Mobile terminals developed for use in Wideband Code-Division Multiple Access (W-CDMA) systems generally use a continuously transmitted, code-multiplexed pilot signal (known as the common pilot channel, or CPICH, in 3GPP specifications) for channel estimation. Although a code-multiplexed pilot channel performs well in unicast radio environments, the MBSFN channel has a much larger delay spread and thus a larger number of paths to estimate in the radio receiver. Accurate channel estimation requires long averaging over many slots. This is difficult to realize in situations where a small duty cycle is used, i.e., where a mobile terminal's receiver is only operational during intervals that are as short as possible. Thus, improved pilot signals are needed.

SUMMARY

In various embodiments of the present invention, pilot sequences are generated based on slot-specific sequences at the symbol level, i.e., before spreading. In several embodiments of the present invention, these slot-specific, symbol-level sequences are then spread using an Orthogonal Variable Spreading Factor (OVSF) code. The spread pilot sequence may then be scrambled, in various embodiments of the invention, using a scrambling code (e.g., a "long code"). In several embodiments of the present invention, the pilot sequences are based on maximum-length sequences (m-sequences), which are well known sequences that have good periodic auto-correlation properties. In some embodiments, a symbol-level sequence is generated by pre-scrambling an input sequence that comprises at least one instance of an m-sequence with the conjugate values for the scrambling code segment corresponding to the current slot. In this way, the values of the initial sequence appear in the scrambled sequence.

In an exemplary method, a pilot symbol sequence is obtained for each slot of one or more frames of a broadcast/multicast signal, so that the pilot symbol sequence varies for each slot of a given frame. The pilot symbol sequence for each slot is spread with a channelization code, and the spread pilot symbol sequence for each slot is scrambled, using a scrambling code, to form a first pilot channel signal. The first pilot channel signal is transmitted so that the first pilot channel signal is time-division multiplexed with one or more traffic channel signals transmitted during each slot and code-division multiplexed with a second pilot channel signal transmitted during all slots of the one or more frames.

In some embodiments, obtaining the pilot symbol sequence for each slot comprises generating the pilot symbol sequence for each slot as a function of a portion of the scrambling code corresponding to the slot. In some of these embodiments, generating the pilot symbol sequence for each slot comprises pre-scrambling a pre-determined symbol sequence by the conjugates of a series of values from the scrambling code, so that the corresponding values of the pre-determined symbol sequence appear in the first pilot channel signal, after spreading and scrambling. In some embodiments, the pre-determined symbol sequence comprises at least one instance of a maximum-length sequence; various of these embodiments may comprise, for example, two concatenated instances of a length-63 maximum-length sequence, extended with two symbols to form a 128-symbol sequence, or a length-127 maximum-length sequence, extended with one symbol to form a 128-symbol sequence.

In some embodiments, spreading the pilot symbol sequence for each slot comprises spreading the pilot symbol sequence for each slot with an orthogonal variable spreading factor (OVSF) code, wherein the OVSF code is selected so that the first pilot channel signal is orthogonal to the second pilot channel signal. In some of these embodiments, an OVSF code having a spreading factor of two may be used.

Processing circuits configured to carry out one or more of the techniques summarized above are also described herein. The present invention may, of course, be carried out in other ways than those specifically set forth herein without departing from essential characteristics of the invention. Upon reading the following description and viewing the attached drawings, the skilled practitioner will recognize that the described embodiments are illustrative and not restrictive, and that all changes coming within the meaning and equivalency range of the appended claims are intended to be embraced therein.

DETAILED DESCRIPTION

Various aspects of the present invention are described below in the context of specifications and standards, currently under development by the $3^{rd}$-Generation Partnership Project, for the delivery of Multimedia Broadcast Multicast Services (MBMS) using a single-frequency network (SFN), and more particularly in the context of the so-called Integrated Mobile Broadcast (IMB) solutions for MBMS over SFN (MBSFN) currently under discussion among 3GPP participants. Of course, those skilled in the art will appreciate that the techniques described herein are not limited to application in these particular systems, and may be applied to other wireless systems, whether already developed or yet to be planned.

Figure 1:
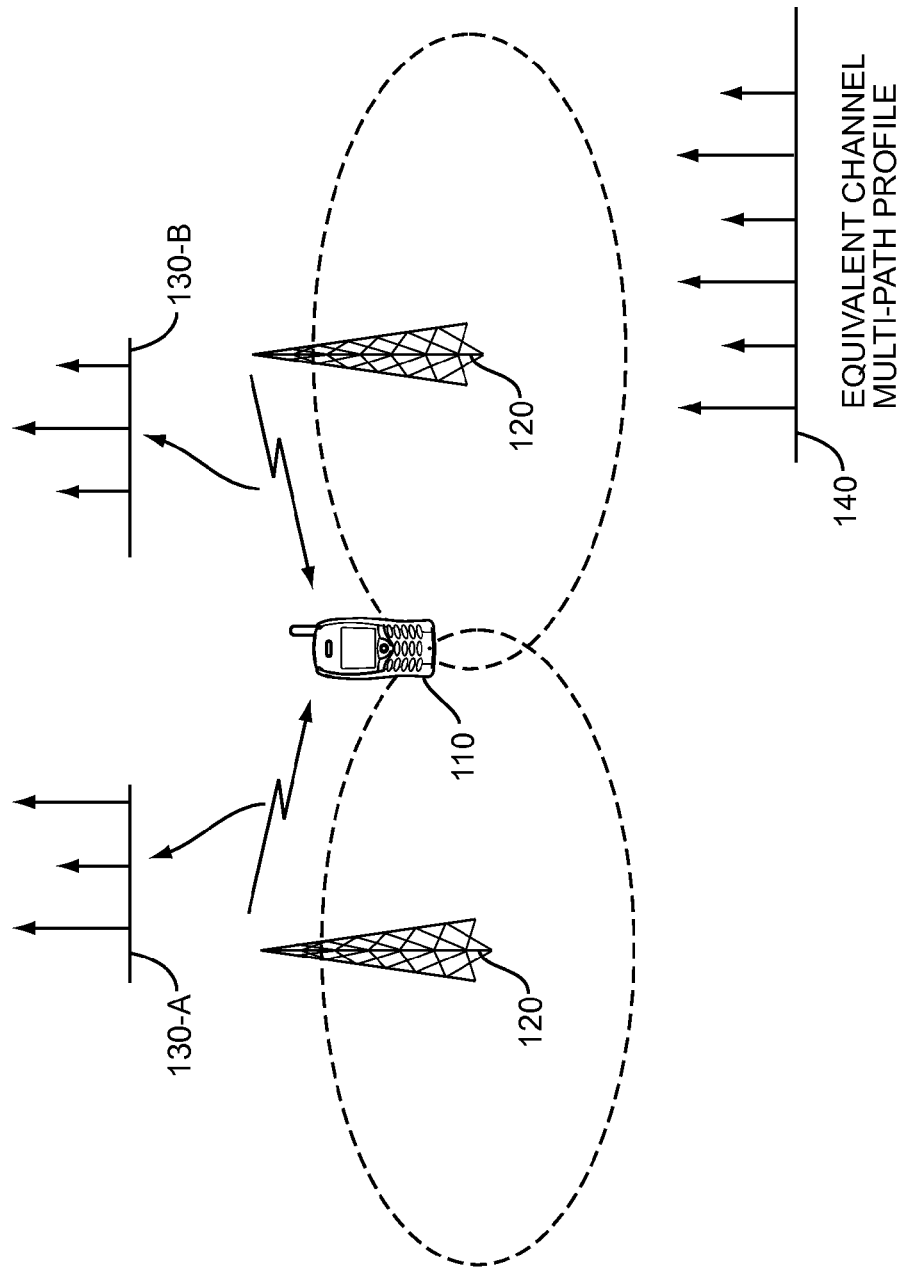
FIG. 1 illustrates an exemplary wireless communication system utilizing multi-carrier transmission.

As discussed above, MBSFN has recently been specified in 3GPP for Release 7 UTRA systems. The MBSFN feature provides significantly higher spectral efficiency compared to Release 6 MBMS, and is primarily intended for broadcasting high bit-rate mobile television services on dedicated MBMS carriers. Broadcasting in an SFN network is illustrated in FIG. 1, which illustrates a portion of a mobile communications network 100 that includes a mobile terminal 110 receiving transmissions from two base stations 120. When cell-specific scrambling is used by each base station 120, then transmissions from the base station on the right side would appear as inter-cell interference to mobile terminals demodulating and decoding transmissions from the base station 120 on the left side, and vice-versa. In a single-frequency network transmission, on the other hand, the same scrambling and channelization codes are used by both base stations 120. Thus, the signal transmitted from an adjacent base station 120 becomes visible as additional multipath signals, which can be taken into account by the mobile terminal 110 as additional components of the desired signal.

MBSFN enhances the physical layer specifications for MBMS in 3GPP's Release 6 by adding support for SFN operations for MBMS point-to-multipoint transmissions on a dedicated MBMS carrier. The new specifications also support higher service-bit-rates, and more efficient time-division multiplexing of services for reducing terminal battery consumption by allowing discontinuous reception (DRX) of services. MBSFN uses the same types of channels that are used for Release 6 MBMS point-to-multipoint transmissions.

To provide smooth integration of the MBSFN feature to any existing UTRA system, MBSFN has been specified for downlink physical layer channel structures for both frequency-division duplexing (FDD) and time-division duplexing (TDD) modes. In particular, standards have been developed for each of UTRA's three variants, namely: MBSFN based on W-CDMA (FDD); MBSFN based on Time-Division Synchronous Code-Division Multiple Access, known as TD-SCDMA (TDD); and MBSFN based on Time-Division Code-Division Multiple Access, known as TD-CDMA (TDD).

The FDD-related version of MBSFN uses the WCDMA common physical layer channels for downlink transmission of data, and no paired uplink transmissions occur. For the TDD-related versions of MBSFN, all slots are used for downlink transmissions when networks are optimized for broadcast. Hence, no duplexing occurs in MBSFN in either case. Thus, the differences between the various versions of MBSFN are primarily limited to the downlink physical layer slot formats, to the way mobile television services are time-multiplexed, and to the particular chip rates used in the case of the TD-SCDMA and 7.68 mega-chip-per-second (Mcps) TD-CDMA. (The chip rate for the third TDD option, 3.84 Mcps TD-CDMA, is the same as used in FDD.)

When multimedia services data is broadcast in all downlink slots, the meanings of TDD and FDD become obsolete, in the sense that no duplexing between transmission directions is occurring. Thus, as noted above, the differences in MBSFN operation in networks nominally designated as TDD networks and FDD networks is basically limited to details of the construction of the common downlink physical channels. Thus, an important work item in 3GPP involves the specification of a W-CDMA-based MBSFN approach, as a fourth TDD option in which all slots are dedicated for broadcast. This fourth TDD option has been referred to at various stages as MBSFN Downlink Optimized Broadcast (DOB) or as MBSFN Integrated Mobile Broadcast (IMB). MBSFN IMB is intended to be fully compatible with relevant radio-frequency requirements for TDD operation.

Those skilled in the art will appreciate that although the terms IMB and Integrated Mobile Broadcast are repeatedly used herein, these are simply terms referring to a particular W-CDMA MBSFN solution. The inventive techniques disclosed herein are by no means limited to systems or operating modes referenced by those particular names, but can be applied in a variety of contexts, under various names, such as DOB, HS-B (High Speed Broadcast), etc.

Existing IMB proposals for WCDMA use a code-multiplexed pilot signal (CPICH) that is continuously transmitted for use by mobile terminals in channel estimation. Although a code-multiplexed CPICH performs well in unicast radio environments, the MBSFN channel has a much larger delay spread and thus a larger number of paths to estimate in the radio receiver. This can be seen in FIG. 1, where multipath profiles 130-A and 130-B, corresponding to the left- and right-hand base stations 120, respectively, appear to mobile terminal 110 as a single multi-path profile 140 having a larger delay spread than either of the constituent multi-path profiles 130. Those skilled in the art will appreciate that accurate channel estimation requires long averaging over many slots, which is difficult to realize in case of a short duty cycle (where the UE receiver parts are only operational during as short as possible durations).

Figure 2:
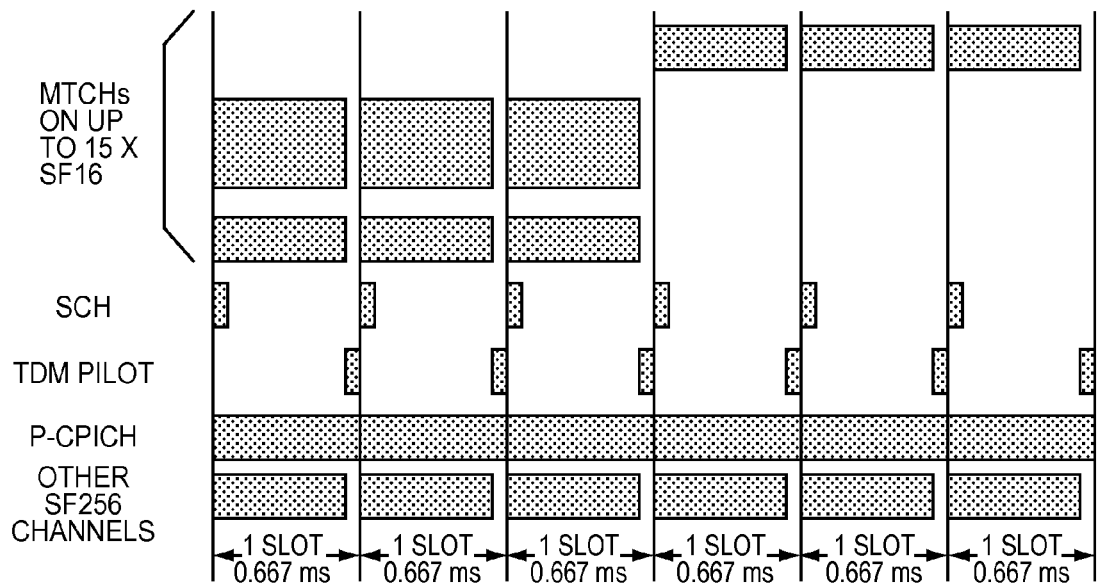
FIG. 2 illustrates a channel structure for an exemplary multimedia broadcast/multicast system.

To improve channel estimation in MBFSN systems, participants in 3GPP specification activities have agreed that a time-division-multiplexed (TDM) pilot sequence of 256 chips should be provided at the end of each transmission slot, in addition to the continuous CPICH. This TDM pilot sequence can be used to by receiving mobile terminals to improve channel estimation quality. An illustration of the resulting proposed channel format is shown in FIG. 2, where each channel in the vertical dimension is separated from the others by code-division multiplexing. As seen in FIG. 2, the proposed broadcast channel format may include up to fifteen code-multiplexed MBMS traffic channels (MTCHs), each transmitted with a spreading factor of sixteen (SF16). The broadcast signal further includes a synchronization channel (SCH) and a primary common pilot channel (P-CPICH), both of which are the same as previously specified W-CDMA channels. (Details for the SCH and CPICH formats may be found, e.g., in 3GPP TS 25.221, v8.5.0, "3$^{rd}$ Generation Partnership Project; Technical Specification Group Radio Access Network; Physical channels and mapping of transport channels onto physical channels (TDD) (Release 8)", May 2009.) Other channels with spreading factors of 256 (SF256) may also be code-multiplexed with the MTCHs, the SCH, and the P-CPICH.

Those skilled in the art will appreciate that each of the traffic channels illustrated in FIG. 2 are transmitted during less than the entire duration of each slot. In fact, only the P-CPICH is transmitted continuously. Leaving a small gap at the end of each slot allows an additional pilot signal to be time-division multiplexed (TDM) with the MTCHs and the other traffic channels. Accordingly, the TDM pilot is not impaired by inter-cell interference from the traffic channels.

To help improve the quality of channel estimation, it is generally desired that the TDM pilot sequences have good auto-correlation properties. Further, it has also been agreed within 3GPP that TDM pilot sequences need to maintain orthogonality with the CPICH. The focus of the following discussion is techniques for forming and transmitting TDM pilot signals based on pilot sequences that are generally optimized to enable accurate channel estimation under the constraint that the transmitted TDM pilot is orthogonal to the CPICH.

Several of the pilot sequences described below are generated based on slot-specific sequences at the symbol level, i.e., before spreading. In several embodiments of the present invention, these slot-specific, symbol-level sequences are then spread using an Orthogonal Variable Spreading Factor (OVSF) code. The use of such a code, which may in some embodiments be a spreading factor 2 OVSF code of [1, −1], ensures that the spread pilot sequence maintains orthogonality with respect to the CPICH spread by the all 1's OVSF code. Of course, the use of spreading codes with other spreading factors, such as an OVSF code with a spreading factor of 16, is also possible.

Generally speaking, the spread pilot sequence may then be scrambled, in various embodiments of the invention, using a scrambling code (e.g., a "long code"). The resulting TDM pilot sequence, which appears only at the end of each slot as pictured in FIG. 2. For example, if a single SF2 sequence is used, it has good autocorrelation properties for the even lags, and has pseudo-random autocorrelation properties for the odd lags.

In several embodiments of the present invention, TDM pilot sequences are based on maximum-length sequences (m-sequences), which are well known sequences that have good periodic auto-correlation properties. The m-sequences can have length $2^L-1$, where L is an integer number greater than 1. The m-sequences can be generated using a simple shift-register architecture, such as the simple shift register design illustrated in FIG. 3. Shift register 300 includes a series of delay elements 310 configured with feedback from the last and second-to-last delay elements, through modulo-2 adder 320, to the input of the shift register. (Of course, alternative shift-register architectures are also possible, including those configured according to the Galois configuration, rather than the Fibonacci configuration of FIG. 3.) Those familiar with maximum-length sequences will appreciate that the connections to the modulo-2 adder can be determined by a primitive polynomial of degree L. Thus, for example, to generate an m-sequence of length 63 (L=6), one can use a primitive polynomial of degree 6 such as $x^6+x+1$. This gives the three connections to the modulo-2 adder 320 in FIG. 3.

Figure 3:
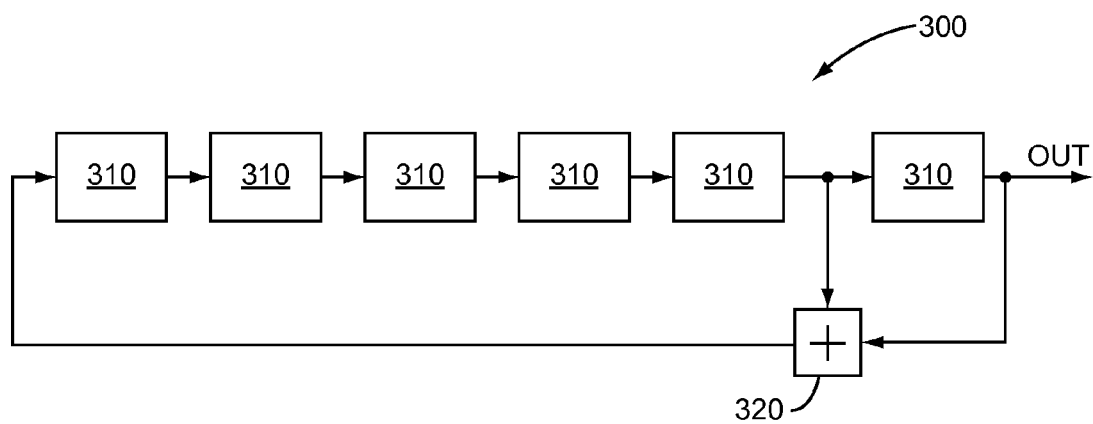
FIG. 3 illustrates an exemplary shift register for generating a maximal-length sequence.
Figure 4:
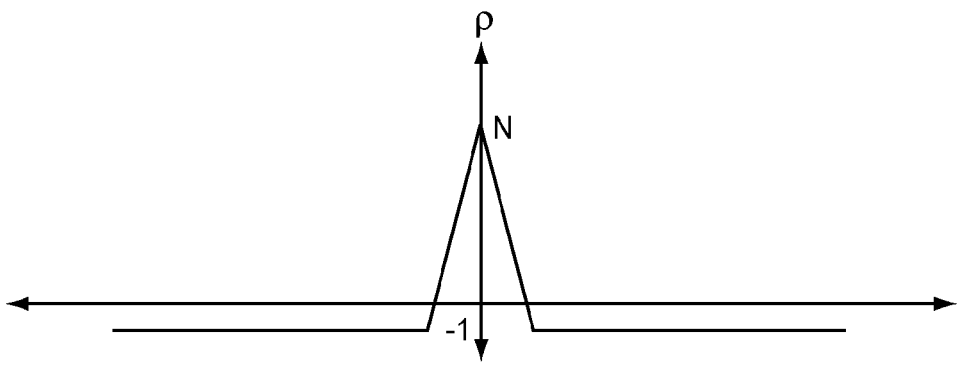
FIG. 4 illustrates the periodic autocorrelation properties of an m-sequence.

The generated length-63 sequence according to the shift register of FIG. 3 is $m_{63}$=[1 0 0 0 0 0 1 0 0 0 0 1 1 0 0 0 1 0 1 0 0 1 1 1 1 0 1 0 0 0 0 1 1 1 0 0 1 0 0 1 0 1 1 0 1 1 1 0 1 1 1 0 0 1 1 0 1 0 1 0 1 1 1 1 1]. The {0, 1} values in the m-sequence are then be converted to antipodal values {1, −1}. The periodic autocorrelation property of an antipodal-valued m-sequence of length N is illustrated in FIG. 4. It can be seen that ρ(0)=N, and ρ(n)=−1 for −N+1≤n≤−1 and 1≤n≤N−1. In general, the periodic autocorrelation of a sequence of length N is defined as:

$$\rho(n) = \sum_{i=0}^{N-1} m(i) \oplus m((i+n)\% N),$$

where (a % b) represents the remainder of (a/b). Here, the correlation is calculated over the entire duration of the sequence.

Figure 5:
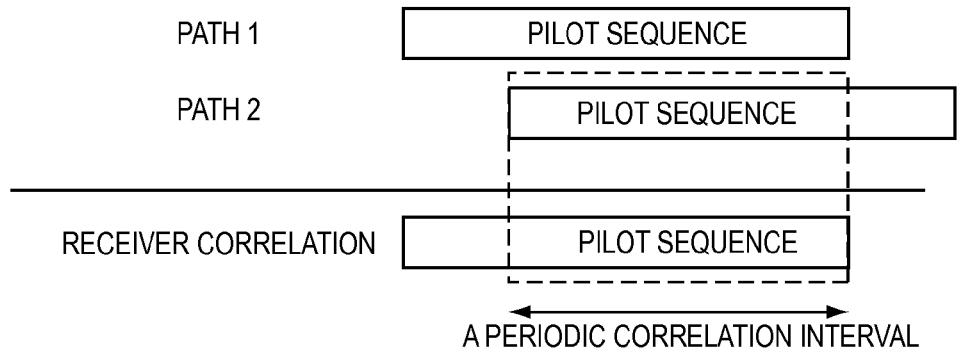
FIG. 5 illustrates the effects of aperiodic autocorrelation in a multipath channel.

The autocorrelation properties of the m-sequence make it attractive as a pilot sequence for time acquisition or channel estimation. However, in multipath environments, aperiodic correlations may impact performance more. As illustrated FIG. 5, the pilot sequence may be received via a two-path channel. In order for the receiver to estimate the channel coefficient of the first path, the receiver aligns its local copy of the pilot sequence according to the arrival time of the 1st path and performs correlation. In this process, interference from the second path is picked up via the aperiodic autocorrelation between the pilot sequence received via the 2nd path and the receiver local generated sequence. Here "aperiodic autocorrelation" refers to a correlation result when the correlation interval less than the full sequence length, as pictured in FIG. 5. Although the m-sequence has very good periodic autocorrelation properties, it is not designed to have particularly good aperiodic autocorrelation properties.

Figure 6:
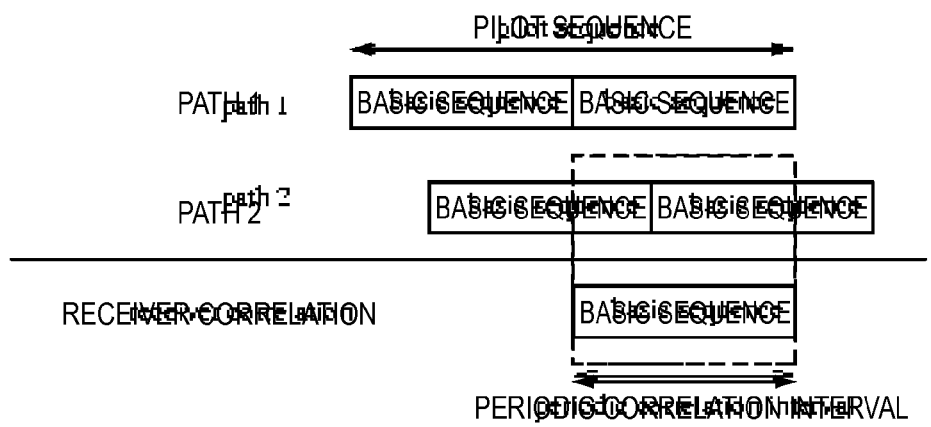
FIG. 6 illustrates the use of a repeated sequence to provide periodic autocorrelation properties in a multipath channel.

To take full advantage of good sequence autocorrelation properties, a good pilot sequence can be based on repeating a basic sequence, e.g., an m-sequence or any other sequences of good autocorrelation properties. This is Illustrated in FIG. 6, where a pilot sequence is obtained by repeating a basic sequence several times. At the receiver, the basic sequence can be used to pick up the channel coefficient of path 1 (as shown). In this case, the interference from path 2 will also be picked up; however in this case through a periodic autocorrelation. As noted above, if an m-sequence is used as the basic sequence, such periodic autocorrelation will have values −1. To achieve this effect, the basic sequence can be repeated an integer number of times, as shown in FIG. 6, or a fraction of the basic sequence can be repeated.

Figure 7:
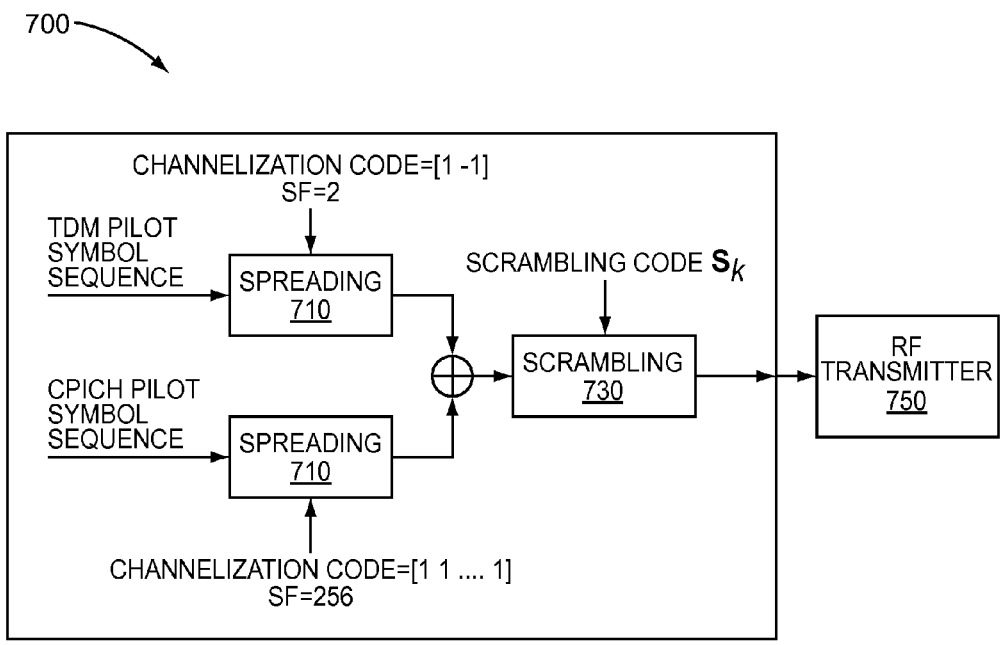
FIG. 7 illustrates elements of a processing circuit in a transmitter according to some embodiments of the invention.

As discussed above, m-sequences can serve as the basis for a good TDM pilot symbol sequence. However, as noted earlier, it is also desirable that a TDM pilot signal maintains orthogonality with the CPICH. As suggested above, this may be accomplished by spreading the TDM pilot symbol sequence using an OVSF code, orthogonal to that used by CPICH, and further scrambling the spread sequence by a WCDMA long code. One such sequence generation process is illustrated in FIG. 7, which illustrates functional components of one or more processing circuits 700, such as might be found in base station nodes 120 of FIG. 1. Those skilled in the art will appreciate that processing circuits 700 may comprise, for example, one or more microprocessors, microcontrollers, digital signal processors, and/or customized digital hardware, as well as one or more memory circuits configured to store program instructions for execution by corresponding processing elements, program data, configuration, and the like.

Whether implemented in pure hardware or a combination of hardware, processor elements, and corresponding program instructions, the processing circuits 700 include two spreaders 710, which spread a TDM pilot symbol sequence and a CPICH pilot symbol sequence, respectively, according to corresponding channelization codes. The two spread sequences are added with adder 720, and then scrambled at scrambler 730, using a common scrambling code. The resulting pilot channel signal is then passed to radio-frequency (RF) transmitter circuitry 750 for transmission to one or more mobile stations, such as mobile station 110 in FIG. 1.

In more detail, the processing circuits 700 take a pre-determined symbol sequence $p'_k$, spread the symbol sequence by an OVSF code having a spreading factor of two, and combine the spread TDM pilot symbol sequence with a spread CPICH pilot symbol sequence. The combined sequences are then scrambled using a common scrambling code sequence $s_k$, which may be, for example, a WCDMA long code. In the process illustrated in FIG. 7, the TDM pilot symbol sequence is spread by the spreading factor 2 OVSF code [1, −1], which ensures orthogonality with CPICH. Thus, in some embodiments according to this approach, a symbol-level TDM pilot sequence of 128 bits is first spread by [1, −1], and the spread chips are further scrambled by the long code, which varies from slot to slot.

Several variants of the approach described above are possible. For example, a symbol-level sequence according to some embodiments is obtained by taking the modulo-2 sum of the long code and an extended m-sequence. In these embodiments, the desired output sequence includes an extended m-sequence $p_{128}$ (128 chips long), which is obtained based on a basic sequence of length-63 m-sequence:

$$p_{128}=[m'_{63}, m'_{63}, m'_{63}(0), m'_{63}(1)]$$

where $m'_{63}(i)$ is the ith bit of $m'_{63}$, which is $1-2m_{63}$. Note that in this formulation, the elements of $p_{128}$ and $m'_{63}$ takes on values $\{1, -1\}$, i.e., a logical value 0 in $m_{63}$ is mapped to 1 in $m'_{63}$, and logical value 1 in $m_{63}$ is mapped to −1 in $m'_{63}$. Given that $s_k$ is the long (scrambling) code during the interval for the last 256 chips of slot k, then the input symbol-level sequence $p'_k$ for generating the desired output TDM pilot sequence $p_{128}$ in slot k is given by $p_k'(i)=p_{128}(i)s_k^*(2i)$, for i=0, 1, . . . , 127, where $p_k'(i)$ is the ith element of the symbol-level sequence $p'_k$, and $p_{128}(i)$ and $s_k(i)$ are the i-th element of the extended m-sequence $p_{128}$ and long code sequence $s_k$, respectively. Here, it is assumed that the elements of $s_k$ have unity amplitude, such as values $\{1,-1\}$ or unity-amplitude QPSK values.

Those skilled in the art will observe that the extended m-sequence $p_{128}$ that is desired to appear in the output is pre-scrambled by the conjugate of even (or odd) values of the scrambling sequence, so that subsequent scrambling will leave the desired extended m-sequence values for the even (or odd) chip values. Thus, spreading and scrambling the symbol-level sequence $p'_k$ according to FIG. 7 results in the eventual TDM pilot sequence:

$$z=(p_{128}(0),-p_{128}(0)s_k^*(0)s_k(1),p_{128}(1),-p_{128}(1)s_k^*(2)s_k(3),\dots).$$

That is:

$$z(i) = \begin{cases} p_{128}(i) & i = 0, 2, 4, \dots, 254 \\ x(i) & i = 1, 3, 5, \dots, 255, \end{cases}$$

where $x(i)=p_{128}(\lfloor i/2 \rfloor)s_k^*(\lfloor i/2 \rfloor)s_k(i)$ and $\lfloor q \rfloor$ represents the floor function of q (i.e., the closest integer smaller than or equal to q). Thus, the even-numbered chips of the final output sequence z correspond directly to the extended m-sequence $p_{128}$. The odd-numbered chips can be thought of as pseudo-random, due to the pseudo-random properties of the scrambling code.

In another embodiment, also based on an extended m-sequence of 128 chips, a symbol-level sequence $p'_k$ for each slot is obtained by taking the modulo-2 sum of a pre-determined extended m-sequence and the long code segment corresponding to that slot. The extended m-sequence (128 chips long) in this embodiment is obtained based on a basic sequence of length-127 m-sequence $p_{128}=[m'_{127},1]$, where $m'_{127}(i)$ is the i-th bit of $m'_{127}$, which is $1-2m_{127}$. Again, the elements of $p_{128}$ and $m'_{127}$ take on values $\{1,-1\}$, i.e. a logical value 0 in $m_{127}$ is mapped to 1 in $m'_{127}$, and logical value 1 in $m_{127}$ is mapped to −1 in $m'_{127}$. The opposite mapping may also be used.

Figure 8:
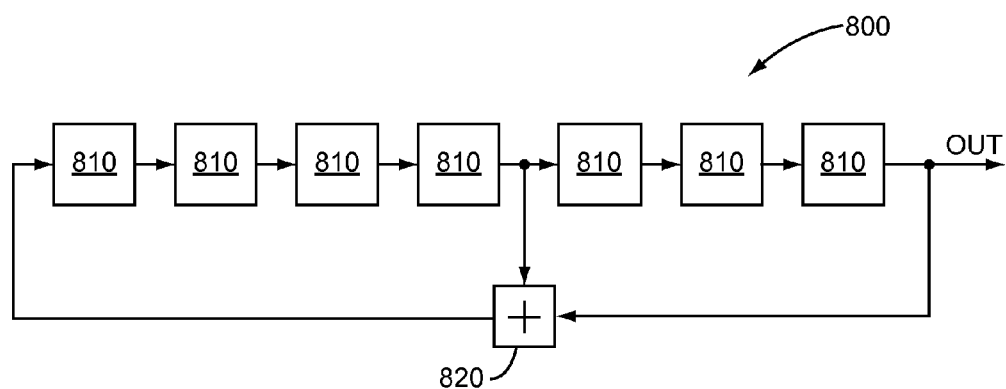
FIG. 8 illustrates another exemplary shift register configured to generate a maximal-length sequence.

Any m-sequence of length 127 may be used in the previous formulation. For example, a primitive polynomial of degree 7, such as $x^7+x^3+1$, may be used in the formulation of a shift register-based m-sequence generator. This polynomial gives the three connections from delay elements 810 to the modulo-2 adder 820 shown in the shift register 800 of FIG. 8. In this case, the generated m-sequence is: $m_{127}$=[1 0 0 0 0 0 0 1 0 0 0 1 0 0 1 1 0 0 0 1 0 1 1 1 0 1 0 1 1 0 1 1 0 0 0 0 0 1 1 0 0 1 1 0 1 0 1 0 0 1 1 1 0 0 1 1 1 1 0 1 1 0 1 0 0 0 0 1 0 1 0 1 0 1 1 1 1 1 0 1 0 0 1 0 1 0 0 0 0 1 1 0 1 1 1 1 0 0 0 1 1 1 0 1 1 1 1 0 0 1 0 1 1 0 0 1 0 0].

The remaining steps of generating the TDM pilot sequence are the same as the first embodiment discussed above. Thus, if $s_k$ is the long (scrambling) code during the last 256 chips interval of slot k, then the symbol-level sequence for generating a TDM pilot sequence in slot k is $p'_k(i)=p_{128}(i)s_k^*(2i)$, for i=0, 1, . . . , 127, where $p'_k(i)$ is the i-th element of the symbol-level sequence $p'_k$, and $p_{128}(i)$ and $s_k(i)$ are the i-th elements of the extended m-sequence $p_{128}$ and long code sequence $s_k$, respectively.

Spreading and scrambling the symbol-level sequence $p'_k$ according to FIG. 7 in this case results in the eventual TDM pilot sequence:

$$z=(p_{128}(0),-p_{128}(0)s_k^*(0)s_k(1),p_{128}(1),-p_{128}(1)s_k^*(2)s_k(3),\dots).$$

That is:

$$z(i) = \begin{cases} p_{128}(i) & i = 0, 2, 4, \dots 254 \\ x(i) & i = 1, 3, 5, \dots, 255, \end{cases}$$

where $x(i)=p_{128}(\lfloor i/2 \rfloor)s_k^*(\lfloor i/2 \rfloor)s_k(i)$. Basically, the even-numbered chips are taken from the extended m-sequence and the odd-numbered chips can be thought of as pseudo-random, due to the pseudo-random properties of the scrambling code.

In still other embodiments, the TDM pilot sequence can be based on a basic sequence having a length of 63, 64, 127, or 128. Still other basic sequences may be considered. These basic sequences can be extended to length 128, as needed, by repeating chip values in a manner similar to that described in embodiments 1 and 2. This gives a sequence $p_{128}$. Then, the same procedures described above can be used to obtain the symbol-level sequence (length 128), and the eventual pilot sequence (length 256).

In various embodiments, the basic sequence or the complete pilot sequence can be pre-generated and stored in the memory of a base station (NodeB, in 3GPP terminology) or user terminal. In some embodiments, the pilot sequence can be pre-scrambled first, e.g., using the base station scrambling code. The illustrated steps are repeated for each slot of one or more frames of a broadcast/multicast signal, although the processing need not be synchronous (e.g., the processing for two or more slots may be performed ahead of time). In any case, the process for each slot begins, as shown at block 910, with obtaining a pilot symbol sequence for the slot, such that the pilot symbol sequence varies for each slot of a given frame. In some embodiments, as was discussed in detail above, the pilot symbol sequence may be generated as a function of a portion of the scrambling code corresponding to the particular slot—because the scrambling code segment corresponding to each slot of a given frame is different, the pilot symbol sequences generated from those segments will generally differ as well.

As shown at block 920, the pilot symbol sequence is spread, using a channelization code. In some embodiments, as was discussed earlier, the channelization code is an orthogonal variable spreading factor (OVSF) code, selected so that the transmitted TDM pilot signal is orthogonal to the transmitted CPICH signal. In some embodiments, this OVSF code has a spreading factor of 2, although other spreading factors may be used instead. As shown at block 930, the spread pilot symbol sequence is scrambled, using a scrambling code, to form the TDM pilot channel signal; the TDM pilot channel signal is then transmitted to one or more mobiles. As shown at block 940, the TDM pilot channel signal is time-division multiplexed with one or more traffic channel signals transmitted during the corresponding slot. The TDM pilot channel is also code-division multiplexed with a second pilot channel signal (e.g., the CPICH) transmitted during all slots of each frame.

Figure 9:
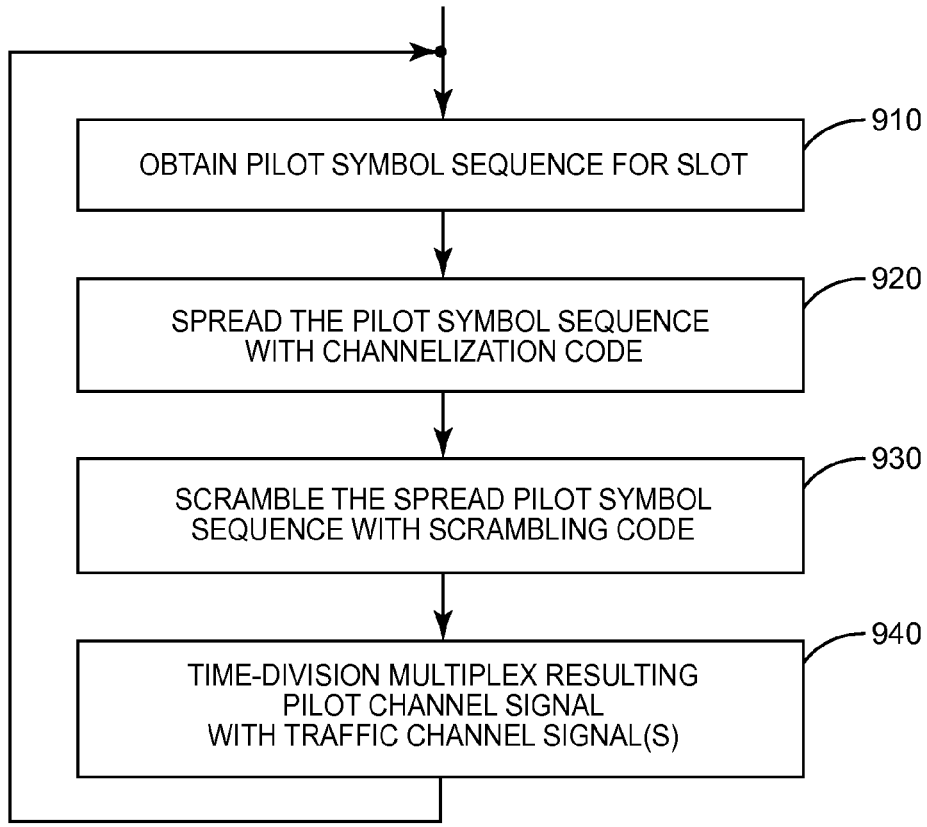
FIG. 9 is a process flow diagram illustrating a method for transmitting a broadcast/multicast signal in a mobile communications network.
Figure 10:
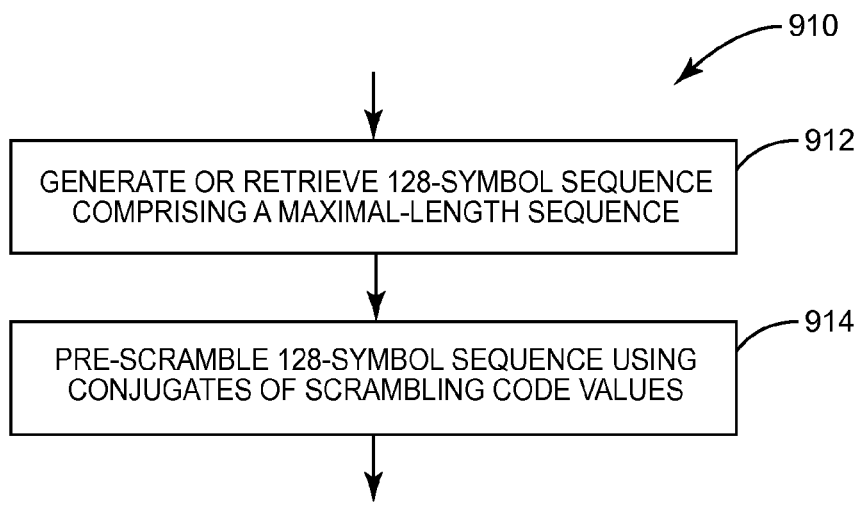
FIG. 10 is a process flow diagram illustrating an exemplary method for obtaining a pilot symbol sequence according to some embodiments of the invention.

As noted above, the TDM pilot symbol sequence, which is ultimately spread and scrambled, may be pre-calculated and stored in a memory, in some embodiments. In other embodiments, it may be generated as needed. FIG. 10 illustrates a technique for obtaining a pilot symbol sequence according to some embodiments of the invention. As shown at block 912, a 128-symbol sequence that includes at least one instance of a maximal-length sequence is generated (e.g., using a shift register implementation of an m-sequence generator) or retrieved from memory. The 128-symbol sequence is then "pre-scrambled" by combining the 128-symbol sequence with the conjugates of a series of values from the scrambling code. This is done so that the corresponding values of 128-symbol values show up in the pilot channel signal generated by the process of FIG. 9, i.e., in the sequence produced by the spreading and scrambling processes pictured at blocks 920 and 930.

Simulations of the processes described above have been performed to evaluate the benefits of using the proposed sequences. In these simulations, main-lobe to average side-lobe power ratio (MSPR) was used as a performance measure, and it was assumed that random chips values are present preceding and succeeding a 256-chip pilot sequence in the received signal. After feeding the simulated received signal into a pilot-sequence matched filter, the sidelobes of the matched filter output were measured over a delay window indicative of maximum multipath delay uncertainties. Compared to the use of a pseudo-random sequence, performance enhancements in excess of 1 dB were observed.

Those skilled in the art will appreciate that the techniques and apparatus described above provide means for a WCDMA based MBSFN system to support an enhanced channel estimation scheme required to operate in a SFN broadcast radio channel, while also supporting a short duty cycle, so that mobile terminal receiver parts need only be operational during durations as short as possible. Of course, those skilled in the art will also appreciate that the present invention may be carried out in other ways than those specifically set forth herein without departing from essential characteristics of the invention. Thus, embodiments of the present invention include methods according to the techniques illustrated and more generally described above, as well as wireless transceivers, such as might be used at a base station node, configured to carry out one or more of these techniques. The present embodiments are therefore to be considered in all respects as illustrative and not restrictive, and all changes conning within the meaning and equivalency range of the appended claims are intended to be embraced therein.

What is claimed is:

1. A method for transmitting a broadcast/multicast signal in a mobile communications network from a base station operating in a Single Frequency Network (SFN) that includes one or more other base stations transmitting the broadcast/multicast signal, the method comprising:

obtaining a first pilot symbol sequence for each slot of one or more frames of the broadcast/multicast signal, so that the first pilot symbol sequence varies for each slot of a given frame in dependence on a scrambling code corresponding to the slot;

channelization code spreading the first pilot symbol sequence for each slot;

scrambling the spread first pilot symbol sequence for each slot, using the scrambling code corresponding to the slot, to form a first pilot channel; and transmitting the first pilot channel signals so that the first pilot channel signals are time-division multiplexed with one or more traffic channel signals transmitted during each slot; and transmitting, during all slots of the one or more frames, a second pilot channel signal that is code division multiplexed with the first pilot channel signal.

2. The method of claim 1, wherein obtaining the first pilot symbol sequence for each slot comprises generating the first pilot symbol sequence for each slot as a function of a portion of the scrambling code corresponding to the slot.

3. The method of claim 2, wherein generating the first pilot symbol sequence for each slot comprises pre-scrambling a pre-determined symbol sequence by the conjugates of a series of values from the scrambling code, so that the corresponding values of the pre-determined symbol sequence appear in the first pilot channel signal, after spreading and scrambling.

4. The method of claim 3, wherein the pre-determined symbol sequence comprises at least one instance of a maximum-length sequence.

5. The method of claim 4, wherein the pre-determined symbol sequence comprises one of:
   two concatenated instances of a length-63 maximum-length sequence, extended with two symbols to form a 128-symbol sequence; or
   a length-127 maximum-length sequence, extended with one symbol to form a 128-symbol sequence.

6. The method of claim 1, wherein channelization code spreading the first pilot symbol sequence for each slot comprises spreading the first pilot symbol sequence for each slot with an orthogonal variable spreading factor (OVSF) code, wherein the OVSF code is selected so that the first pilot channel signal is orthogonal to the second pilot channel signal.

7. The method of claim 6, wherein spreading the first pilot symbol sequence for each slot with the OVSF code comprises spreading the first pilot symbol sequence for each slot with an OVSF code having a spreading factor of two.

8. The method of claim 1 wherein the scrambling code is common to the SFN.

9. A base station node configured to transmit a broadcast/multicast signal in a wireless communications system, as part of a Single Frequency Network (SFN) that includes one or more other base stations transmitting the broadcast/multicast signal, wherein the base station node comprises:
a radio-frequency transmitter circuit; and
one or more processing circuits configured to:
obtain a first pilot symbol sequence for each slot of one or more frames of a broadcast/multicast signal, so that the first pilot symbol sequence varies for each slot of a given frame in dependence on a scrambling code corresponding to the slot;
channelization code spread the first pilot symbol sequence for each slot;
scramble the spread first pilot symbol for each slot, using a scrambling code corresponding to the slot, to form a first pilot channel signal; and
transmit the first pilot channel signals, via the radio-frequency transmitter, so that the first pilot channel signals are time-division multiplexed with one or more traffic channel signals transmitted during each slot; and
transmit, during all slots of the one or more frames, a second pilot channel signal that is code division multiplexed with the first pilot channel signal.

10. The base station node of claim 9, wherein the one or more processing circuits are configured to obtain the first pilot symbol sequence for each slot by generating the first pilot symbol sequence for each slot as a function of a portion of the scrambling code corresponding to the slot.

11. The base station node of claim 10, wherein the one or more processing circuits are configured to generate the first pilot symbol sequence for each slot by pre-scrambling a pre-determined symbol sequence by the conjugates of a series of values from the scrambling code, so that the corresponding values of the pre-determined symbol sequence appear in the first pilot channel signal, after spreading and scrambling.

12. The base station node of claim 11, wherein the pre-determined symbol sequence comprises at least one instance of a maximum-length sequence.

13. The base station node of claim 12, wherein the pre-determined symbol sequence comprises one of:
two concatenated instances of a length-63 maximum-length sequence, extended with two symbols to form a 128-symbol sequence; or
a length-127 maximum-length sequence, extended with one symbol to form a 128-symbol sequence.

14. The base station node of claim 9, wherein the one or more processing circuits are configured to spread the first pilot symbol sequence for each slot by spreading the first pilot symbol sequence for each slot with an orthogonal variable spreading factor (OVSF) code, wherein the OVSF code is selected so that the first pilot channel signal is orthogonal to the second pilot channel signal.

15. The base station node of claim 14, wherein the one or more processing circuits are configured to spread the first pilot symbol sequence for each slot with the OVSF code by spreading the first pilot symbol sequence for each slot with an OVSF code having a spreading factor of two.

16. The base station of claim 9 wherein the processing circuit is further configured to use a scrambling code common to the SFN to scramble the spread first pilot symbol sequence.

17. A single-frequency broadcast/multicast communications system, comprising two transmitter units in adjacent cells of a cellular communications network, wherein the transmitter units are configured to transmit one or more identical traffic channels using identical channelization and scrambling codes and to transmit an identical first pilot channel signal, wherein the transmitter units each comprise a radio-frequency transmitter circuit and one or more processing circuits configured to:
obtain a pilot symbol sequence for each slot of one or more frames of a broadcast/multicast signal, so that the pilot symbol sequence varies for each slot of a given frame in dependence on the scrambling code corresponding to the slot;
channelization code spread the pilot symbol sequence for each slot;
scramble the spread pilot symbol sequence for each slot, using a scrambling code corresponding to the slot, to form the first pilot channel signal; and
transmit the first pilot channel signal, via the radio-frequency transmitter, so that the first pilot channel signal is time-division multiplexed with one or more traffic channel signals transmitted during each slot; and
transmit, during all slots of the one or more frames, a second pilot channel signal that is code division multiplexed with the first pilot channel signal.

* * * * *

UNITED STATES PATENT AND TRADEMARK OFFICE
CERTIFICATE OF CORRECTION

PATENT NO. : 8,848,675 B2  
APPLICATION NO. : 13/739851  
DATED : September 30, 2014  
INVENTOR(S) : Bottomley et al.

Page 1 of 1

It is certified that error appears in the above-identified patent and that said Letters Patent is hereby corrected as shown below:

In the Specification

In Column 7, Line 33, delete "$P_{128}=[m'_{63}, m'_{63}, m'_{63}(0), m'_{63}(1)]$," and insert -- $P_{128}=[m'_{63}, m'_{63}, m'_{63}(0), m'_{63}(1)],$ --, therefor.

In Column 10, Line 10, delete "conning" and insert -- coming --, therefor.

In the Claims

In Column 10, Line 29, in Claim 1, delete "channel;" and insert -- channel signal; --, therefor.

In Column 11, Line 16, in Claim 9, delete "symbol" and insert -- symbol sequence --, therefor.

In Column 12, Line 16, in Claim 16, delete "station of" and insert -- station node of --, therefor.

Signed and Sealed this  
Twelfth Day of May, 2015

Michelle K. Lee  
*Director of the United States Patent and Trademark Office*